United States Patent
Liu et al.

(10) Patent No.: US 8,553,427 B2
(45) Date of Patent: Oct. 8, 2013

(54) MOTHERBOARD

(75) Inventors: Meng-Zhou Liu, Shenzhen (CN); Wen-Wu Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 284 days.

(21) Appl. No.: 13/072,831

(22) Filed: Mar. 28, 2011

(65) Prior Publication Data
US 2012/0212921 A1    Aug. 23, 2012

(51) Int. Cl.
 H05K 1/11    (2006.01)
 H05K 1/14    (2006.01)

(52) U.S. Cl.
 USPC ............ 361/803; 361/760; 361/764; 361/792

(58) Field of Classification Search
 USPC ................. 361/729–730, 749, 760–764, 803, 361/814, 790–792
 See application file for complete search history.

(56) References Cited

U.S. PATENT DOCUMENTS

| | | | |
|---|---|---|---|
| 6,496,376 B1 * | 12/2002 | Plunkett et al. | 361/729 |
| 2004/0090761 A1 * | 5/2004 | Chuang et al. | 361/803 |
| 2008/0106477 A1 * | 5/2008 | Mashima et al. | 343/702 |
| 2008/0143609 A1 * | 6/2008 | Mashima et al. | 343/702 |
| 2009/0175019 A1 * | 7/2009 | Koyama et al. | 361/803 |

* cited by examiner

*Primary Examiner* — Tuan T Dinh
(74) *Attorney, Agent, or Firm* — Altis & Wispro Law Group, Inc.

(57) ABSTRACT

A motherboard includes a first circuit board, a second circuit board, and wiring. The first circuit board includes at least a programmable chip, a programming interface, a first data interface, and at least one jumper corresponding to the programmable chip. The second circuit board includes a CPU (central processing unit), a RAM unit, and at least a second data interface corresponding to the programmable chip. The motherboard of the present disclosure concentrates programmable chips on the first circuit board, thereby providing a unified programming interface to enhance the convenience of programming multiple programmable chips.

4 Claims, 2 Drawing Sheets

MOTHERBOARD

BACKGROUND

1. Technical Field

The present disclosure relates to a motherboard.

2. Description of Related Art

In many commonly used computers, programmable chips, such as FPGA, CPLD, EEPROM, and data interfaces corresponding thereto are respectively disposed on different functional areas of a motherboard. Hence, when programming multiple programmable chips, each chip may need to be programmed separately and when the programming interfaces of the programmable chips differ, different interfaces is required to access each chip. Consequently, the programming process is complex and lacks efficiency.

What is needed, accordingly, is a motherboard capable of overcoming the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
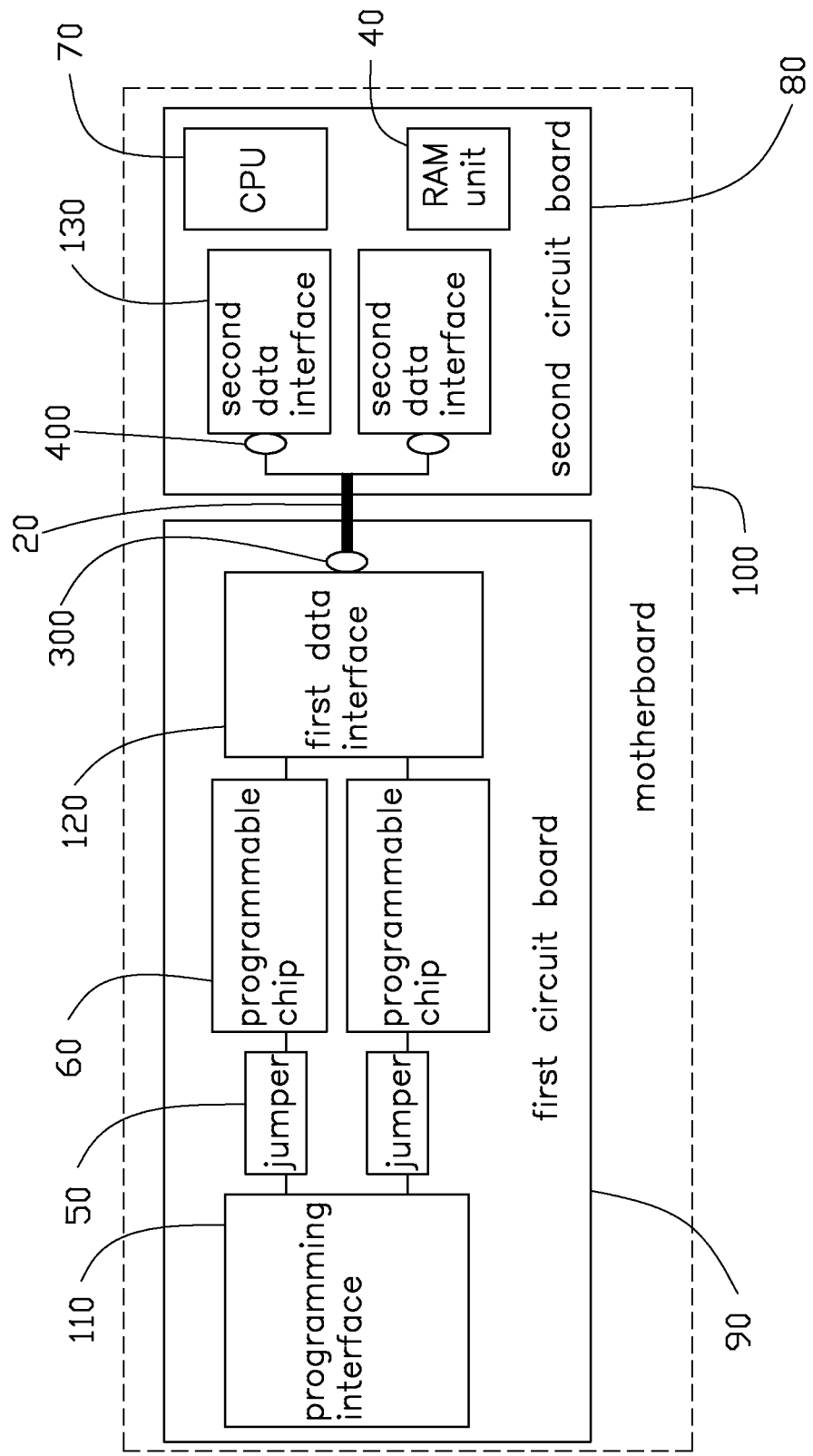
FIG. 1 is a block diagram of a preferred embodiment of a motherboard of the present disclosure.
Figure 2:
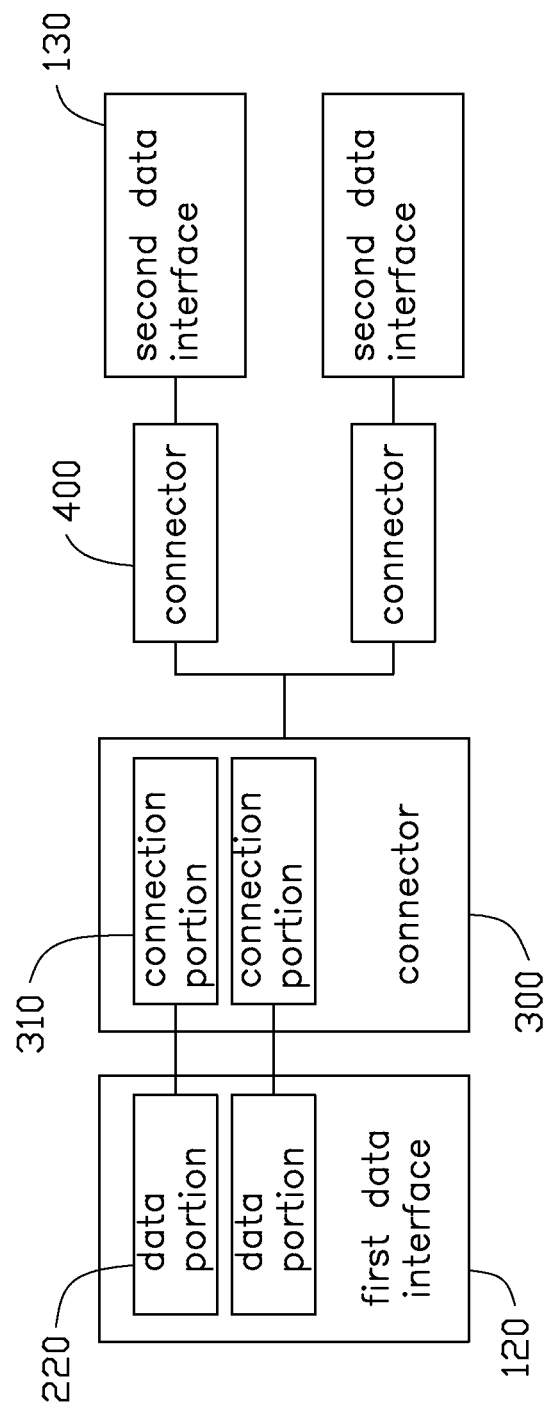
FIG. 2 shows connection of a first data interface to a second data interface through connectors of the wiring of the motherboard of FIG. 1.

As shown in FIG. 1 and FIG. 2, a preferred embodiment of a motherboard 100 includes a first circuit board 90, a second circuit board 80, and wiring 20.

The first circuit board 90 includes a programming interface 110, a first data interface 120, a plurality of programmable chips 60 and a plurality of jumpers 50. The programming interface 110, such as a Joint Test Action Group (JTAG) interface, receives programming data. The number of programmable chips 60 matches that of the jumpers 50. Each programmable chips 60 is connected to the programming interface 110 through a jumper 50. Each jumpers 50, such as a switch type jumper, selectively connects/disconnects the programmable chip 60 to/from the programming interface 110. The first circuit board 90 can be disposed on a portable tray of a housing (not shown), such that the first circuit board 90 can be removed to allow the programmable chip 60 to be programmed without disassembling the housing. The first data interface 120 includes a plurality of data portions 220 isolated from each other. The number of data portions 220 matches that of the programmable chips 60, and each programmable chips 60 corresponds to and is connected to a data portion 220.

The second circuit board 80 includes a CPU (central processing unit) 70, a RAM (random access memory) unit 40, and a plurality of second data interfaces 130. The number of second data interface 130 matches that of the data portion 220. The components (other than the programmable chip 60) on the second circuit board 80 and their arrangement match that of a frequently used motherboard and their details are omitted herefrom.

One end of the wiring 20 has a first connector 300 disposed thereon, and the other end of the wiring 20 has a plurality of connectors 400 disposed thereon. The connector 300 includes a plurality of connection portions 310, isolated from each other. The number of connection portions 310 matches that of the data portions 220. When the connector 300 is connected to the first data interface 120, each data portions 220 is correspondingly connected to one connection portion 310. Each connector 400 corresponds to and is connected to one second data interface 130.

The first data interface 120 is connected to one end of the wiring 20 through the connector 300. The second data interfaces 130 are connected to the other end of the wiring 20 through the connectors 400. As a result, the first circuit board 90 is connected to the second circuit board 80 through the wiring 20, and each programmable chip 60 can independently communicate with one second data interface 130 corresponding thereto.

When programmable chip 60 is to be programmed, the portable tray with the first circuit board 90 mounted thereon is pulled out from the housing, disconnecting the first data interface 120 from the connector 300. The programming interface 110 is connected to programming equipment. The jumper 50 corresponding to the programmable chip 60 to be programmed is closed when the other jumper 50 is opened. During programming, the programming interface 110 receives programming data, inputting to the programmable chip 60 through the jumper 50 which is closed. When programming multiple programmable chips 60, after programming one programmable chip 60, the jumper 50 corresponding to the programmable chip 60 is opened while the jumper 50 corresponding to the next programmable chip 60 to be programmed is opened.

The motherboard 100 as disclosed concentrates the programmable chips 60 on the first circuit board 90. In addition to providing a unified programming interface, the programmable chip 60 can be taken out from the housing and programmed without disassembling the housing, which is especially advantageous in programming multiple programmable chips 60. In addition, the connector 300 includes a plurality of connection portions 310, isolated from each other and thereby disconnecting the programmable chips 60 from the second circuit board 80 simply by unplugging the connector 300.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motherboard comprising:

a first circuit board comprising a plurality of programmable chips, a programming interface for receiving programming data, a first data interface, and a plurality of jumpers, wherein the number of the programmable chips is equal to the number of the jumpers, each programmable chip is connected to the programming interface through a corresponding jumper, each programmable chip is connected to the first data interface, and each jumper selectively connects or disconnects a corresponding programmable chip to or from the programming interface;

a second circuit board comprising a CPU, a RAM unit, and a plurality of second data interfaces; and a wiring comprising a first connector disposed on one end and a plurality of second connectors disposed on the other end, wherein the number of the second data interfaces and the number of the second connectors are equal to the number of the programmable chips, the wiring is connected to the first data interface through the first connector, each second data interface is connected to the wiring through a corresponding second connector, the wiring enables the communication between each programmable chip and a corresponding second data interface.

2. The motherboard of claim 1, wherein the first data interface comprises a plurality of data portions, the number of the data portions is equal to the number of the programmable chips, each data portion is connected to a corresponding programmable chip.

3. The motherboard of claim 2, wherein the first connector comprises a plurality of connection portions, the number of the connection portions is equal to the number of the data portions, each connection portion is connected to a corresponding data portion.

4. The motherboard of claim 1, wherein the first circuit board is disposed on a portable tray of a housing.

* * * * *